United States Patent [19]
Norsworthy

[11] Patent Number: 5,339,082
[45] Date of Patent: Aug. 16, 1994

[54] FM/CW SENSOR PROCESSOR FOR TARGET RECOGNITION

[75] Inventor: Keith H. Norsworthy, Bellevue, Wash.

[73] Assignee: The Boeing Company, Seattle, Wash.

[21] Appl. No.: 537,061

[22] Filed: Sep. 29, 1983

[51] Int. Cl.$^5$ .......................... G01S 13/26; F41G 7/28
[52] U.S. Cl. ......................................... 342/90; 342/62; 342/192; 342/196; 342/128
[58] Field of Search ............ 343/5 FT, 5 SA; 342/90, 342/192, 128, 196, 62

[56] References Cited

U.S. PATENT DOCUMENTS

| | | | |
|---|---|---|---|
| 3,987,285 | 10/1976 | Perry | 343/5 FT X |
| 4,034,370 | 7/1977 | Mims | 343/5 DP X |
| 4,047,173 | 9/1977 | Miller | 343/17.2 PC |
| 4,084,148 | 4/1978 | Koshikawa | |
| 4,112,430 | 9/1978 | Ladstatter | 343/5 FT X |
| 4,207,624 | 6/1980 | Dentino et al. | 343/5 FT X |
| 4,225,864 | 9/1980 | Lillington | 343/5 FT X |
| 4,268,828 | 5/1981 | Cribbs et al. | 343/5 FT X |

OTHER PUBLICATIONS

Martinson and Lunsford, "A CMOS/SOS Pipeline FFT Processor-Construction, Performance and Applications".
Barrick, *FM/CW Radar Signals and Digital Processing*, National Oceanic and Atmospheric Administration, Jul. 1973.

*Primary Examiner*—Gilberto Barrón, Jr.
*Attorney, Agent, or Firm*—Kenneth J. Cooper; Bernard A. Donahue

[57] ABSTRACT

A processor for an FM/CW sensor divides the sweep periods of the sensor into a number of subsweep intervals, measures the received power within a multiplicity of frequency windows during each of the subsweep intervals, and then performs a spectrum analysis of the power measurements in each frequency window to characterize the reflectors in the corresponding range bins of the FM/CW sensor footprint.

27 Claims, 6 Drawing Sheets

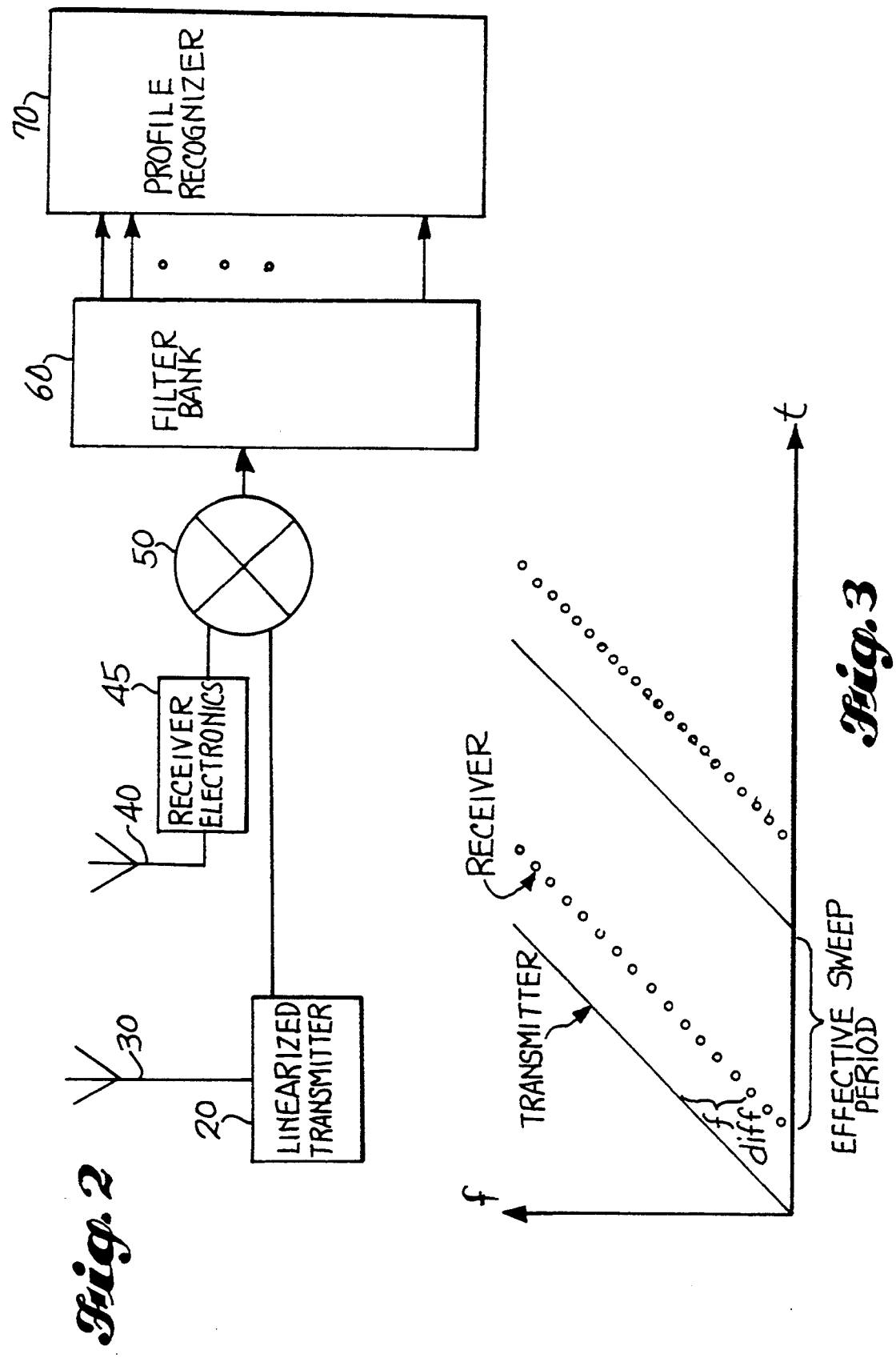

FM/CW SENSOR PROCESSOR FOR TARGET RECOGNITION

BACKGROUND OF THE INVENTION

This invention relates to the field of recognition radars and specifically to the use of such radars with guided missiles.

Recognition radars are used as target seekers on missiles to detect and then lock-in on the targets so that the paths of the missiles can be set to intercept the targets. Target seekers must be small enough to fit within missiles and, ideally, add little weight to the missile. It is of course desirable to have target seekers that do not require costly equipment.

FIG. 1 shows a missile 1 containing target seeker 2. Target 3 is a tank. To recognize the tank as the desired target, target seeker 2 must discriminate that target from ground clutter, e.g., trees 4, and from false targets, e.g., truck 5, both of which are in the target seeker footprint 10.

Target recognition or discrimination typically involves two stages. First, the position and spatial characteristics of the reflectors in the target seeker's footprint are determined. Such reflectors can be objects, like trees or rocks, or they can be parts of an object, like the front, the back, and the turret of a tank. The second stage involves determining whether the relative positions of certain detected reflectors resemble the desired target.

Target seekers or conventional missiles must be able to recognize targets with a high degree of accuracy, typically with one-foot resolution. Target recognition must also be sufficiently fast to allow the target seeker to sweep the desired area and give the missile sufficient time to correct its flight path.

One attempt to use an FM/CW radar system as a target seeker is shown schematically in FIG. 2. Linearized transmitter 20 generates a linearly-modulated frequency signal shown by the solid line in FIG. 3. This signal is sent to antenna 30 and transmitted into the target seeker footprint. The reflections of the transmitted signal are received by antenna 40 and receive electronics 45 forms a reflected signal represented by the dotted line in FIG. 3.

For each "effective sweep period," mixer 50 determines the difference signal, shown as $f_{diff}$ in FIG. 3, between the received signal and the transmitted signal. As shown in FIG. 3, the "effective sweep period" or "sweep period" of an FM/CW target recognition system is equal to the total period of the transmitted signal minus the travel time for the signal to propagate to the footprint and back to the receiver, in this case antenna 40.

The difference signal $f_{diff}$ contains information about the reflectors in the target seeker footprint. Filter bank 60 extracts certain of that information. The number of filters in filter bank 60 depends on the desired resolution. For one foot resolution in a 500 foot footprint, filter bank 60 would require 500 filters. This can make the target seeker extremely large.

Profile recognizer 70 examines the outputs of the filters in filter bank 60 to determine whether certain of the reflectors in that footprint define a target.

The cost of the target seeker in FIG. 2 is very large because linearized transmitter 20 must have almost no non-linearity to achieve the needed resolution. For one foot resolution, the linearized transmitter sweep range must be 500 MHz, which is about the upper limit of contemporary linearized transmitters. If the target seeker is 5,000 feet from a target, then one foot resolution requires that the non-linearity of the linearizer be no more than 1/5000 or approximately 0.02% over the 500 MHz range. Such accuracy far exceeds the specifications of conventional linearized transmitters and the development of such transmitters necessary for the FM/CW target seeker in FIG. 1 will be very difficult and expensive.

One objective of this invention is a low-cost target-seeking radar that is sufficiently accurate for conventional missiles.

Another objective of this invention is a missile target-seeking radar which is very small.

It is also an objective of this invention to have a low-cost, small target seeking radar which has a great deal of resolution and which employs conventional linearized transmitters.

Yet another objective of this invention is to recognize targets very quickly to minimize sensitivity to circuit drifts and missile velocity while maintaining great accuracy.

Additional objectives and advantages of this invention appear in the following description, will be obvious from that description, or may be learned by practice of the invention. The objectives and advantages of this invention may be realized and obtained by the methods and apparatus in the appended claims.

SUMMARY OF THE INVENTION

This invention achieves the objectives listed above and overcomes the problems of the previously known systems by 1) mixing the receiver and transmitter signals to give an output signal, 2) further processing the output signal to measure its subsweep interval power levels in a number of different frequency windows (each corresponding to a different range bin within the sensor foot print) and 3) analyzing the power measurement fluctuations of each frequency window from subsweep to subsweep, to determine certain spatial information used to identify reflectors and recognize targets.

Although the size of the range bins is larger than the desired target resolution, the analysis of the power fluctuations in the frequency windows from subsweep interval to subsweep interval gives the resolution needed by the target seeker.

To achieve the objectives of this invention, as embodied and as broadly described herein, the processor of this invention characterizes reflectors in a footprint of a sensor, the footprint including a plurality of range bins and the sensor being capable of transmitting FM/CW signals having a sweep period into the sensor footprint, receiving reflection signals from the transmitted FM/CW signal striking reflectors in that sensor footprint, and mixing the transmitted and received signals to form an output signal, the processor comprises means for dividing the sweep period into a first number of subsweep intervals, means coupled to the sweep period dividing means and to the sensor for measuring, during each of the subsweep intervals, the power of the output signal in each of a second number of frequency windows each corresponding to a different range bin in the sensor footprint; and means coupled to the power measuring means for analyzing the power measurements in each of the second number of frequency windows during all of the subsweep intervals and for producing a third number of characterization signals representing the spatial characteristics of reflectors in one of the corresponding range bins.

The method of this invention characterizes the reflectors within the footprint of a sensor, the footprint including a plurality of range bins and the sensor being capable of transmitting an FM/CW signal having a sweep period into the footprint, receiving reflections of the transmitted signal from the sensor footprint, and mixing the transmitted and received FM/CW signals to form an output signal, the method comprising the steps of: dividing the sweep period into a first number of subsweep intervals; measuring, during each of the subsweep intervals, the power of the output signal in a second number of frequency windows each corresponding to a different range bin in the sensor footprint; and analyzing the power measurements in each of the second number of frequency windows during all of the subsweep intervals to produce a third number of characterization signals representing the spatial characteristics of reflectors in the corresponding one of the range bins.

The accompanying drawings illustrate an embodiment of this invention and, together with the description of that embodiment, explain the principles of this invention.

BRIEF DESCRIPTION OF THE DRAWINGS

FIG. 2 shows a target seeker for missiles;

FIG. 3 illustrates transmitted and received signals from the target seeker in FIG. 2;

DESCRIPTION OF PREFERRED EMBODIMENTS

Figure 1:
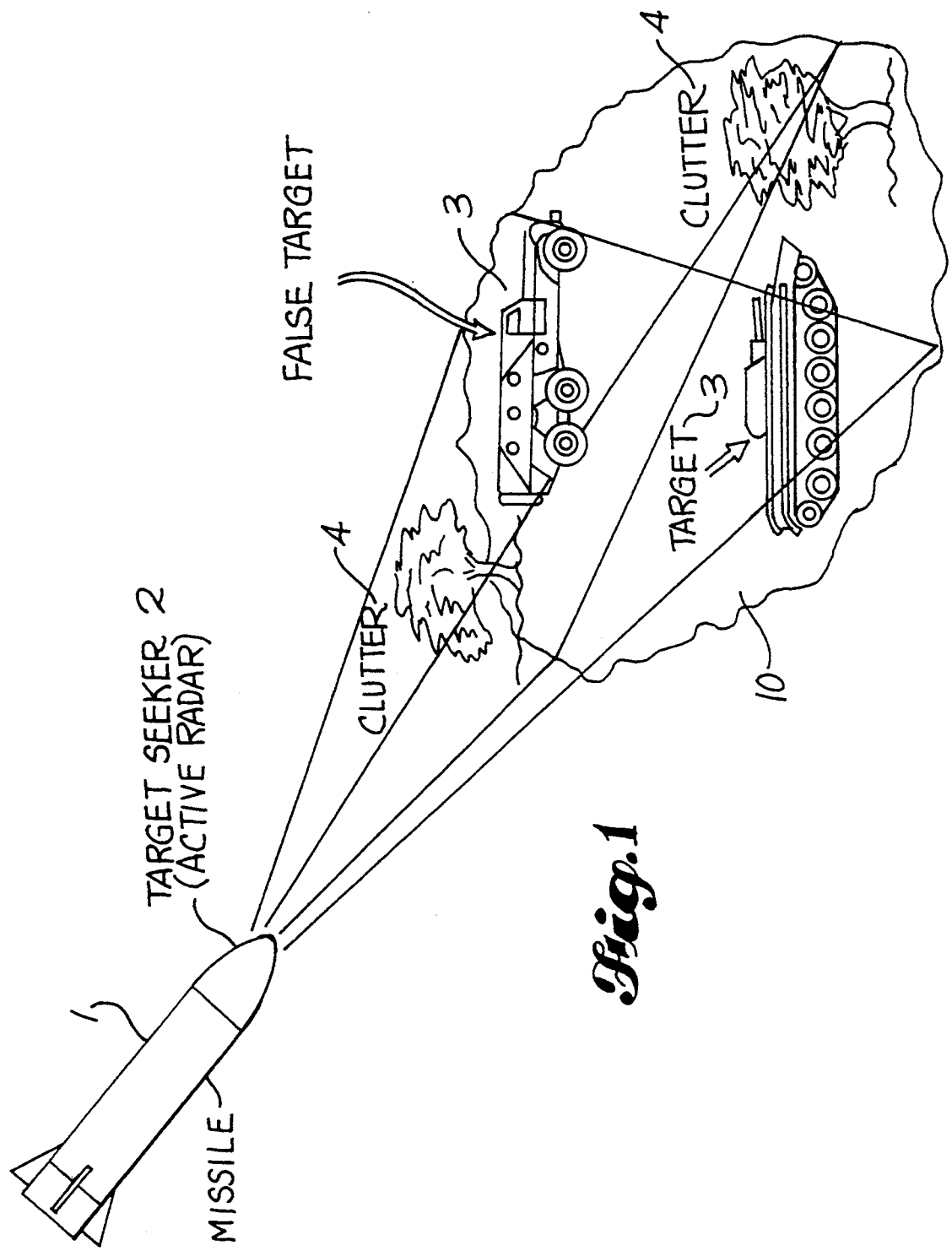
FIG. 1 shows a missile target seeker and various objects detected by the target seeker.

FIGS. 1-3 having been discussed, reference will now be made in detail to a presently preferred embodiment of this invention which is illustrated in FIGS. 4-9 of the accompanying drawings.

Figure 4:
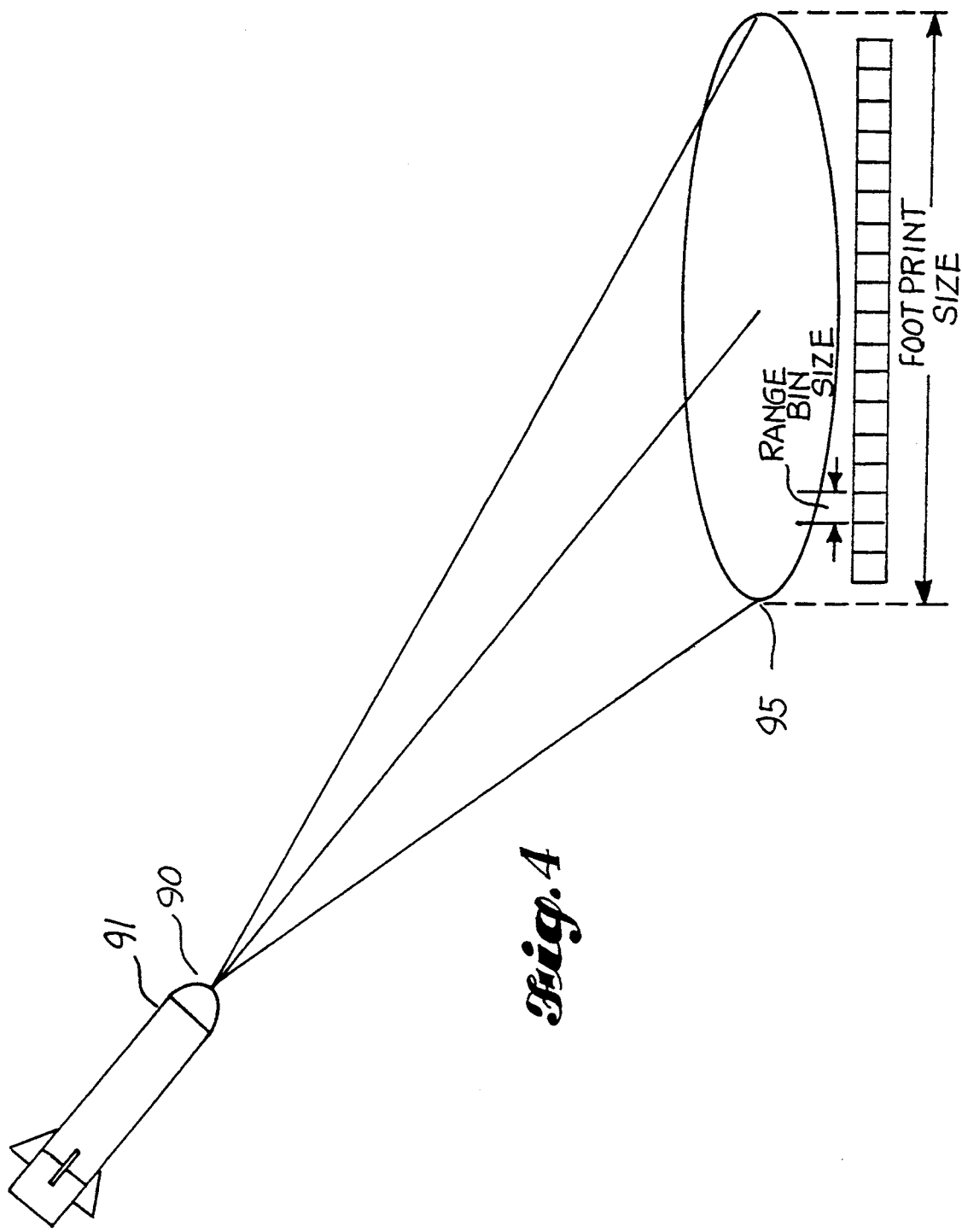
FIG. 4 shows the footprint of a target seeker with a number of range bins.

FIG. 4 shows a target seeker 90 as part of guided missile 91. The target seeker has a footprint 95 which is defined by the beam width of target seeker 90's transmit and receive antennae.

Footprint 95 contains a number of range bins as shown in FIG. 4. The sizes of the range bins are preferably uniform, as indicated in FIG. 4, to facilitate target-seeker processing. Such uniformity is not required, however. It is also preferable to have the range bins overlap for reasons set out below.

Although FIG. 4 shows the range bins totally covering footprint 45, this will not necessarily always be the case. As the target seeker 90 approaches the footprint, the size of the footprint will shrink. The sizes and number of the range bins, however, will remain constant. It is important that the range bins always remain within the footprint.

Figure 5:
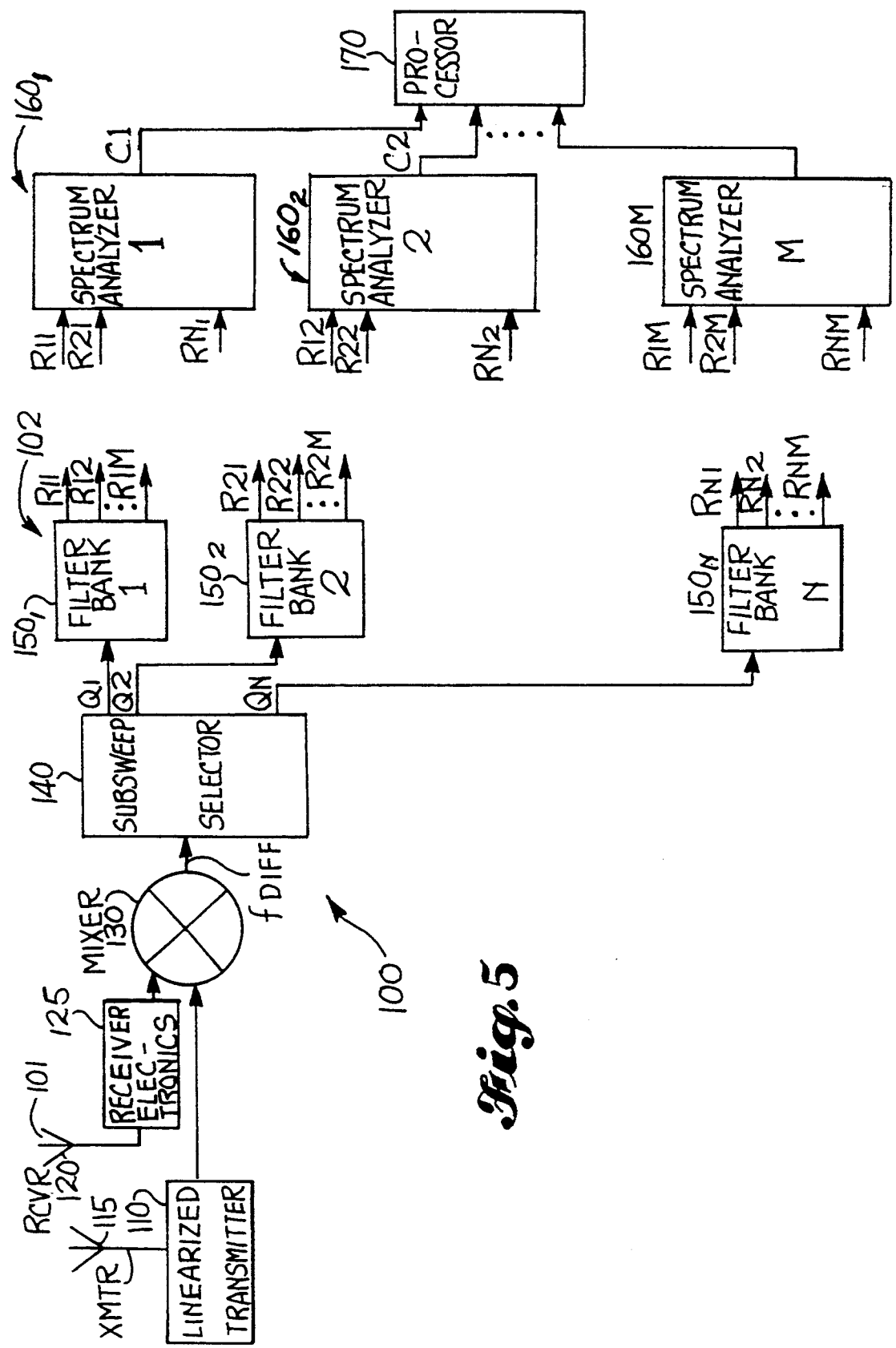
FIG. 5 shows one embodiment of the FM/CW target seeker sensor processor of this invention.
Figure 6:
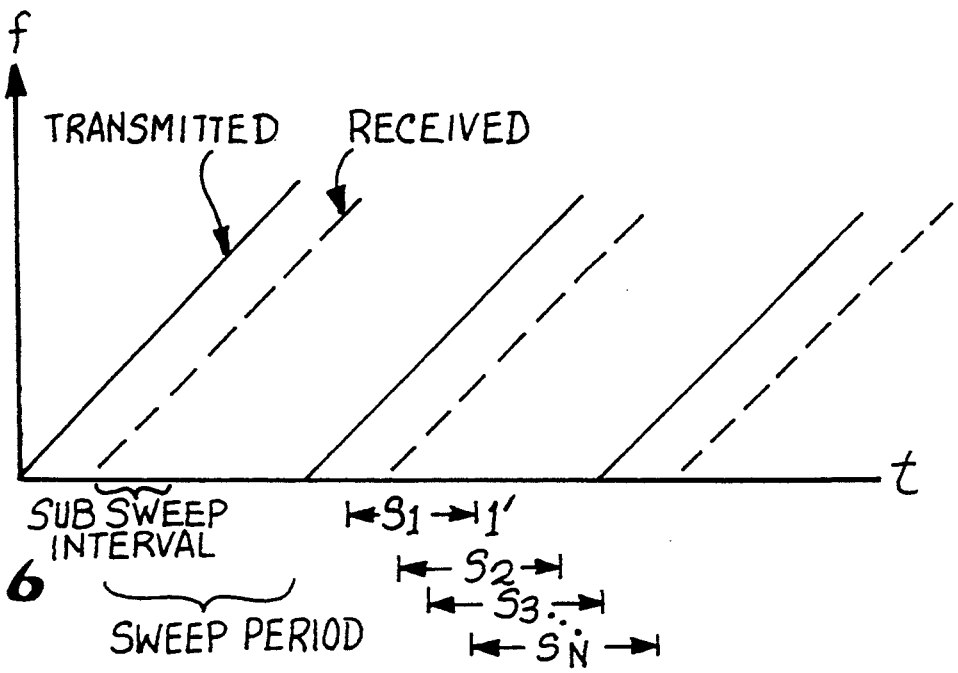
FIG. 6 represents signals and timing for the sensor processor in FIG. 5.

FIG. 5 shows an FM/CW target seeker 100 which includes two major elements: FM/CW sensor 101 and sensor processor 102. In sensor 101, linearized transmitter 110 creates an FM voltage signal whose frequency varies linearly with time as shown in FIG. 6 by the solid line. Transmitting antenna 115 broadcasts that FM signal into the footprint of sensor 101.

Receiving antenna 120 receives the reflections of the signal transmitted by antenna 115 and receive electronics 125 forms a receive signal from those reflections. An example of the receive signal is shown by the dashed line in FIG. 6. It lags the transmitted signal by a period of time which depends on the distance of the target seekers from the objects in its footprint.

For purposes of this invention, the sweep period of the FM/CW signal is defined as the time during each cycle of a transmitted signal that reflections of that signal are received by the FM/CW sensor. This equals the total period of the transmitted signal minus the travel time for the signal to propagate to the footprint and back to the receive antenna. FIG. 6 shows the sweep period for the first cycle of the transmitted signal.

Linearized transmitter 110 and receive electronics 125 send to mixer 130 the transmitted and received signals, respectively. Mixer 130, which is a conventional mixer capable of accommodating the frequencies of the transmitted and received signals, forms an output signal, $f_{diff}$, and sends $f_{diff}$ to subsweep selector 140.

In accordance with the present invention, the FM/CW sensor processor includes means for dividing the sweep period into a first number of subsweep intervals.

FIG. 6 shows a sweep period with subsweep intervals $S_1$-$S_N$. The size of the subsweep intervals depends on the size of the range bins desired in the sensor footprint. The subsweep interval size needed for a range bin size R equals $(2R)/c$, where c is the speed of light.

Preferably, the number of the subsweep intervals, N, should exceed $2\times$ (sweep period/subsweep interval size). Subsweep intervals $S_1$-$S_N$ therefore overlap to some degree. The amount of overlap depends upon the particular design application. FIG. 6 shows subsweep intervals $S_1$-$S_N$ with a 50% overlap.

In the embodiment shown in FIG. 5, the means for dividing the sweep period into a number of subsweep intervals includes subsweep selector 140. Selector 140 has a master timer synchronized with the sweep period and either preset or programmable timers to count off each of the subsweep intervals.

Subsweep selector 140 shown in FIG. 5 contains N outputs $Q_1$-$Q_N$, each of which corresponds to a different one of the subsweep intervals. During the subsweep interval $S_i$ corresponding to an output $Q_i$, output signal $f_{diff}$ appears on $Q_i$.

The FM/CW sensor processor of this invention also contains means for measuring, during each of the subsweep intervals, the power of output signal $f_{diff}$ in a second number of frequency windows. Each of the frequency windows corresponds to a different range bin in the sensor footprint. This measuring means is coupled to the subsweep period dividing means and to the FM/CW sensor.

One key difference between the present invention and prior art FM/CW target seekers is the use of range bins that are larger than the resolution size needed by the FM/CW target seeker. Prior art target seekers typically use range bins whose size equals its range resolution precision (i.e., a desired range resolution precision of five feet required five foot ranges).

The sizes of the range bins used in the target seeker and sensor processor of this invention depend on a number of factors including the size of the desired target and the type of background clutter anticipated. The range bins must be sufficiently large to capture the entire target and preferably to detect enough ground clutter to provide a background reference for subsequent spectral analysis. The range bin cannot be so large as to hide the target in the captured background clutter or to make extremely difficult the subsequent processing that gives the needed resolution to the target seeker.

The sizes of the individual range bins are determined for each application, but typical range bin sizes are from two to four times the target size. As indicated, the range bins may blanket the entire sensor footprint. Preferably the range bins overlap each other to capture targets that may span two abutting range bins.

The frequency windows corresponding to a range bin can be determined from the frequencies that correspond to the maximum and minimum ranges in that range bin. The calculation of those frequencies, which then form the bounds of the frequency window corresponding to a particular range bin, can be accomplished by conventional methods for the particular FM/CW sensor used.

In the embodiment of the invention shown in FIG. 5, the power measuring means includes filter banks 1–N which are designated as $150_1-_N$ in FIG. 5. Each filter bank 1–N corresponds to a different subsweep interval and receives a different signal $Q_1-Q_N$ from subsweep selector 140. During the corresponding subsweep interval, each filter bank filters $f_{diff}$ through M separate filters, where M is the number of range bins in the sensor footprint.

Filter banks 1–N measure the power of the reflected signal in each of the frequency windows. The fluctuation and the power measurements from subsweep to subsweep in a frequency window contain information about the number and relative positions of the reflectors in the corresponding range bins.

Filter banks –N can contain either analog filters with rectified outputs (e.g. SAW filters) or digital filters (e.g., FFT circuits). To save cost, size and complexity, filter banks 1–N can be replaced by a single time-shared filter bank. In such a case, subsweep selector 140 controls the timing of the subsweep intervals to ensure that the proper value of the output signals are sent to the single filter bank at the correct times.

Each filter bank 1–N outputs M signals each corresponding to the values in a different range bin. The filter bank output signal $R_{i,j}$ corresponds to the power in the jth range bin during the ith subsweep interval. Thus, from filter banks 1–N, there would be a total of NxM output signals.

Figure 7:
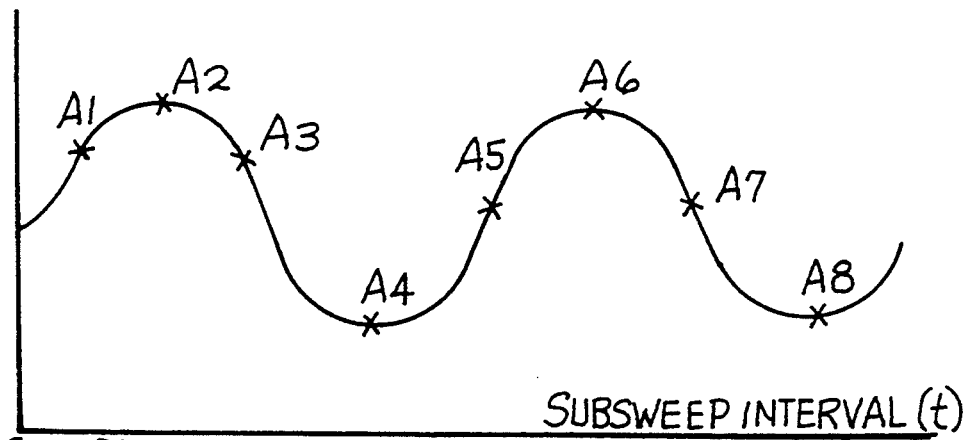
FIG. 7 is a graph of possible power measurements in one range bin in the sensor processor in FIG. 5.

FIG. 7 shows a typical set of stored range bin power values for a range bin containing only two reflectors separated by distance D. The values $A_1-A_8$ would define a sine wave on a graph of power versus subsweep interval count. The frequency of the sine wave in FIG. 7 equals E2D/c] (df/dt), where dr/dr is determined from the transmitted signal.

If there are additional reflectors in the range bin, the power values contained in the range bin define a more complex function which would represent the sum of a large number of sine waves corresponding to the various combinations of reflector separations in the range bins.

In accordance with the present invention, means are coupled to the power measuring means for analyzing the power measurements in each of the second number of frequency windows during all of the subsweep intervals. This analyzing means also produces a third number of characterization signals representing the spatial characteristics of reflectors in a different one of the range bins.

In the embodiment shown in FIG. 5, spectrum analyzers 1–M (denoted as $160_1-160_M$) each correspond to a different frequency window and each form a characterization signal representing the spatial characteristics of the reflectors in the range bins corresponding to that frequency window.

The magnitude spectrum analysis of the frequency window values corresponds closely to the autocorrelation of the radar cross-section "range profile" present in each range bin. The spectrum analysis is indicative of the integral of the reflectors separated by distances proportional to the spectral frequency values. This corresponds statistically to the autocorrelation of that range bin, although the correspondence is not exact. Two pairs of reflectors separated by the same distance will give rise to equal modulation frequencies, but not necessarily equal phases. The methods and apparatus of this invention output characterization signals which are vector integrals of equally separated reflector pairs rather than scalar integrals. The vector integrals lead to a statistical equivalent of the autocorrelation function that is sufficient for these purposes.

Figure 8:
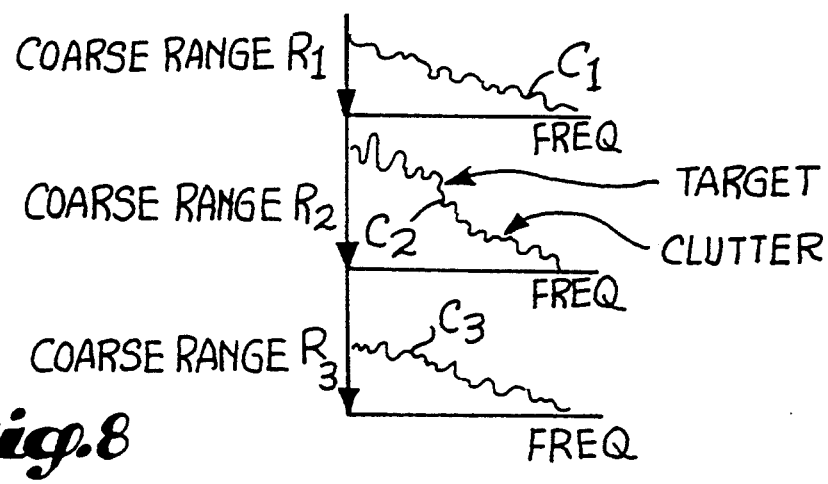
FIG. 8 shows possible characterization signals from the sensor processor in FIG. 5.

FIG. 8 shows sample characterization signals $C_1-C_3$ for three sample coarse ranges, $R_1-R_3$. The characterization signals $C_1$ and $C_3$ for ranges $R_1$ and $R_3$, respectively, contain information about the size and relative spacing of the reflectors in those ranges. If there is only ground clutter in a range, as in ranges $R_1$ and $R_3$, the characterization signal for that range, for example $C_1$ or $C_3$, shows a statistical distribution of reflected power.

If there is a target in a range, then the frequency distribution of the corresponding characterization signal matches the frequency distribution expected from the target. The characterization signal for range $R_2$, which contains a target, is $C_2$ which contains information in the lower frequency portions that represent a unique "fingerprint" of the target. If there were a false target in the range, then, similar information may appear in the corresponding characterization signal, but it will not have the same frequency distribution as would the target.

The requirement that the range be large enough to capture a sufficient amount of ground clutter can now be more easily understood. For proper analysis, the range bin should preferably have enough background clutter to provide a reference for its corresponding characterization signal, thus, the size of the range bin should not be too small.

The overlap of the subsweep intervals can actually be reduced below 50% because the resultant Nyquist folding will occur only at the higher frequencies. As can be seen by the characterization signals in FIG. 8, any "folding-over" at the high frequencies will not inhibit the target detection and classification which focuses primarily on energy at the lower frequencies.

The FM/CW sensor processor of this invention can also include data processing means coupled to the analyzing means for examining the characterization signals to determine the presence of a target. By feeding the characterization signals into processor 170 in FIG. 5, the search for the desired target "fingerprint" can be done quickly and automatically. Furthermore, the processor adds flexibility since the target being searched can be changed.

By analyzing the reflected signal power in large or coarse rather than small or fine range bins, linearized transmitter 110 can have a conventional design. For a coarse range bin of 40 feet and a target to seeker range of 5,000 feet, the linearized transmitter can have a non-linearity of 40/5000 or 0.8%, well within the capabilities of conventional linearizers. The target seeker of this invention can thus be low-cost because it uses conventional elements.

The invention can also be made small since it can use conventional linearized transmitters, and filter banks and spectrum analyzers can be time-shared.

The accuracy of the target seeker using the FM/CW sensor processor of this invention obtains due to the spectrum analysis of each frequency window. With such spectrum analysis, the present invention can give the desired precision of one foot.

The great speed of this invention is due to intrasweep processing. This invention allows all target detection and classification to be carried out each sweep period or cycle of FM/CW target seeker and does not require a correlation between succeeding sweeps. The speed also adds to the target seeker's precision because the target seeker of this invention can resweep the target area to verify its earlier determinations.

Figure 9:
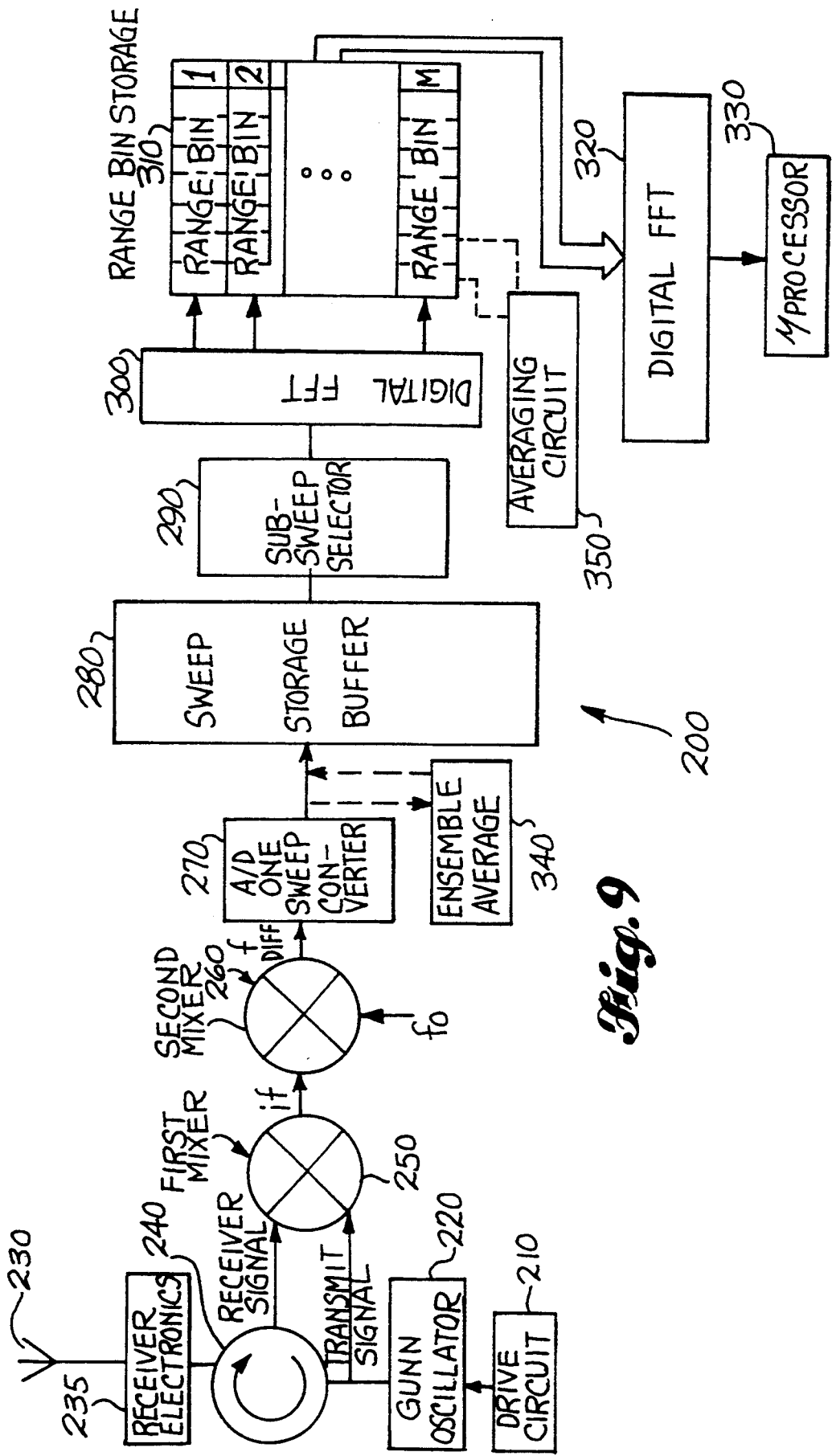
FIG. 9 shows another embodiment of the FM/CW target seeker sensor processor of this invention.

FIG. 9 shows an embodiment of this invention which is very small and low-cost, and, while maintaining the intrasweep processing described above, can use information from successive sweeps to provide greater accuracy.

Target seeker 200 in FIG. 9 contains a drive circuit 210 which generates a voltage ramp output. This output is fed to Gunn oscillator 220 which, with drive circuit 210, forms a linear sweep FM transmit signal that is periodically swept. The FM/CW output of Gunn oscillator 220 is sent to first mixer 250 and also feeds transmit/receive antenna 230 via circulator 240 for transmission into the target seeker's footprint.

Reflections of the transmitted signal are received by antenna 230 and receive electronics 235 feeds a receive signal, also via circulator 240, to first mixer 250.

First mixer 250 is a heterodyne mixer which creates an intermediate signal, $i_f$. For a reflector at range $R_r$, $i_f$ has a frequency equal to $[2R_r/c] (df/dt)$, where $df/dt$ is the rate of frequency change of the transmitted signal.

Intermediate signal $i_f$ is inputted to second mixer 260 along with reference frequency $f_O$ to create a baseband difference signal $f_{diff}$. Reference frequency $f_O$ equals $[2R_c/c] (df/dt)$, where $R_c$ is the distance from antenna 230 to the center of the target seeker footprint. Preferably, second mixer 260 includes a quadrature pair of mixers to create two baseband quadrature components of $f_{diff}$.

Signal $f_{diff}$ is fed to analog/digital converter 270 which passes signals with frequencies below $[2(R_m-R_c)/c](df/dt)$, where $R_m$ is the maximum range of the target seeker footprint and where the sample rate of converter 270 is set a small amount above $[4(R_m-R_c)/c] (df/dt)$.

The samples are stored successively in sweep storage buffer 280. Preferably, sweep storage buffer 280 is a flip-flop buffer so samples taken during one sweep are stored in one part of the buffer and are outputted while samples taken during the succeeding sweep are stored in another part of the buffer.

Subsweep selector 290 includes a switch and a counter. After the number of subsweep intervals in a sweep period has been chosen, the number of samples taken during each subsweep can easily be calculated from the sample rate of converter 270. The counter in selector 290 ensures that the proper number of samples for each subsweep interval is switched to digital FFT 300. Thus, subsweep selector 290 measures the subsweep interval in terms of number of samples rather than in terms of time. Subsweep selector 290 also ensures that the subsweep interval starting times are correct and that the intervals have the proper overlap.

Digital FFT 300 performs a complex number FFT on the samples in each subsweep period to indicate the distribution of signal power over M separate frequency windows, each window corresponding to a different range bin.

Range bin storage 310 stores the outputs of FFT 300 into range bin buffers. As indicated schematically in FIG. 9, each of the rows of range bin storage 310 corresponds to a different frequency window or corresponding range bin and each of the columns corresponds to a different subsweep interval. The actual architecture of range bin storage 310 need not be such an array.

Preferably, range bin storage 310 contains two identical sets of buffers so that range bin information from one cycle can be outputted from one set of range bin buffers while measured power information from the next cycle can be inputted to the other set of range bin buffers.

Digital FFT 320 performs a spectrum analysis of the power values stored in each of the frequency windows corresponding to the range bins. Specifically, FFT 320 performs a real number FFT process to give output magnitudes at N/2 "synthetic frequency" values. The kth set of magnitude values corresponds to the autocorrelation of the range profile in the kth coarse range bin.

Microprocessor 330 is connected to digital FFT 320 and examines the output magnitudes to perform target recognition. Detection of "target-like objects" occurs when the measured power in a coarse range bin exceeds a threshold. Verification of that object as a "true target" occurs when the autocorrelation of the range profile in that coarse range bin is judged to be acceptable for the particular use.

With the system in FIG. 9, the autocorrelation measurement can be abstracted from one sweep, which can be as short as 25 microseconds, although the FFT processing may take a little longer. A further advantage of this system is that the analog-to-digital conversion rates of converter 270 can be kept low, e.g., 1.25 MHz for $R_m-R_c$ equal to 100 ft. and a sweep rate of 500 MHz in 160 microseconds.

The target seeker 200 in FIG. 9 can also include an ensemble averager 340 to average the values received during several sweep periods or cycles. The purpose of such averaging is to reduce noise. If the target seeker is moving, then ensemble averager 340 must phase-compensate its input signal to account for the phase changes of the received signal.

Target seeker 200 may also contain an averaging circuit 350 connected to range bin storage 310. Averaging circuit 350 averages the signals in the range bins storage 310 over several cycles. Since all phase information has been removed from the magnitude values in range bin storage 310, there is no need for phase compensation for averaging circuit 350.

It will be apparent to those skilled in the art that modifications and variations can be made in the FM/CW target seeker and sensor processor methods and apparatus of this invention. The invention in its broader aspects is not limited to the specific details, representative methods and apparatus, and illustrative examples described. Departure may be made from such details without departing from the spirit or scope of the general inventive concept.

What is claimed is:

1. A processor for characterizing reflectors in the footprint of a sensor, said footprint including a plurality of range bins and said sensor being capable of transmitting FM/CW signals having a sweep period into said sensor footprint, receiving reflection signals from said transmitted FM/CW signals striking reflectors in said sensor footprint, and mixing said transmitted and received signals to form an output signal, said processor comprising:
   a) means for dividing said sweep period into a first number of subsweep intervals;
   b) means coupled to said sweep period dividing means for measuring, during each of said subsweep intervals, the power of said output signal in each of a second number of frequency windows each corresponding to a different range bin in said sensor footprint; and
   c) means coupled to said power measuring means for analyzing the power measurements in each of said second number of frequency windows made during all of said subsweep intervals and for producing a third number of characterization signals representing the spatial characteristics of reflectors in said corresponding range bins, 2. The processor in claim 1 further including data processing means coupled to said analyzing means for examining said characterization signals to determine the presence of a predetermined target.

3. The processor in claim 1 further including:
   a sampling circuit connected to said sensor for forming samples of said output signal; and
   a first buffer connected to said sampling circuit for storing said output signal samples for output to said power measuring means, 4. The processor in claim 3 wherein said power measuring means includes a filter, 5. The processor in claim 4 wherein said filter includes circuitry for performing Fourier analysis of said output signal.

6. The processor in claim 5 wherein said Fourier analysis circuitry includes an FFT circuit.

7. The processor in claim 4 wherein said filter includes analog filters with rectified outputs.

8. The processor in claim 4 further including a range bin buffer connected to said filter for storing said frequency window power measurements.

9. The processor in claim 3 wherein said analyzing means includes a spectrum analyzer.

10. The processor in claim 3 wherein said analyzing means includes an FFT circuit.

11. The processor in claim 3 further including first averaging means coupled to said sampling circuit and to said first buffer for averaging samples formed by said sampling circuit during different sweep periods of said sensor, 12. The processor in claim 11 wherein said first averaging means also includes phase compensation means to adjust the amplitude of said samples in accordance with movement by said sensor relative to said footprint.

13. The processor in claim 3 further including second averaging means coupled to said power measuring means to average the frequency window power measurements made during different sweep periods, 14. A target seeker comprising:
   a) a sensor for transmitting FM/CW signals having a sweep period into a sensor footprint and for receiving reflection signals from said transmitted FM/CW signals striking reflectors in said sensor footprint, said sensor footprint including a plurality of range bins;
   b) a mixer which mixes said transmitted FM/CW signals and said reflection signals to form an output signal;
   c) means for dividing said sweep period into a first number of subsweep intervals;
   d) means coupled to said sweep period dividing means for measuring, during each of said subsweep intervals, the power of said output signal in a second number of frequency windows each corresponding to a different range bin in said sensor footprint; and
   e) means coupled to said power measuring means for analyzing the power measurements in each of said second number of frequency windows made during all of said subsweep intervals and for producing a third number of characterization signals representing the spatial characteristics of reflectors in the corresponding one of said range bins, 15. The target seeker in claim 14 further including data processing means coupled to said analyzing means for examining said characterization signals to determine the presence of a target in any of said range bins.

16. The target seeker in claim 15 further including:
   a sampling circuit connected to said sensor for forming samples of said output signal; and
   a first buffer connected to said sampling circuit for storing said output signal samples for output to said power measuring means.

17. The target seeker in claim 16 wherein said power measuring means and said analyzing means each includes FFT circuits.

18. A method for characterizing the reflectors within the footprint of a sensor, said footprint including a plurality of range bins and said sensor being capable of transmitting an FM/CW signal having a sweep period into said footprint, receiving reflections of said transmitted signal from said sensor footprint, and mixing said transmitted and received FM/CW signals to form an output signal, said method comprising the steps of:
   a) dividing said sweep period into a first number of subsweep intervals;
   b) measuring, during each of said subsweep intervals, the power of said output signal in a second number of frequency windows each corresponding to a different range bin in said sensor footprint; and
   c) analyzing the power measurements in each of said second number of frequency windows made during all of said subsweep intervals thereby to produce a third number of characterization signals, each of said characterization signals representing the spatial characteristics of reflectors in the corresponding one of said range bins.

19. The method in claim 18 also including the step of examining said characterization signals to determine the presence of a target.

20. The method in claim 18 also including the step of sampling said output signal.

21. The method in claim 20 also including the step of averaging samples of said output signal over a predetermined number of sweep periods.

22. The method of claim 20 wherein said step of dividing said sweep period into a first number of subsweep intervals includes the step of ensuring that said subsweep intervals each has a duration $t_i$ which equals $(2R)/c$, where c is the speed of light and R is the size of said range bins.

23. The method in claim 22 wherein said step of dividing said sweep period into a first number of subsweep intervals includes the step of setting said first number of intervals to a value equal to twice the ratio of said sweep period to $t_i$.

24. The method of claim 21 wherein the step of determining the frequency window power measurement includes the step of performing Fourier analysis of said output signal samples.

25. The method of claim 21 wherein the step of analyzing the frequency window power measurements includes the step of performing spectrum analysis of said power measurements in said frequency windows.

26. The method of claim 25 wherein the step of performing spectrum analysis includes the step of performing Fourier analysis of said frequency window power measurements.

27. The method in claim 20 further including the step of averaging said frequency window power measurements over a predetermined number of sweep periods.

* * * * *